(12) United States Patent
Eigler et al.

(10) Patent No.: US 11,117,297 B2
(45) Date of Patent: Sep. 14, 2021

(54) RECONFIGURABLE MELT DELIVERY SYSTEM

(71) Applicant: DME COMPANY LLC, Madison Heights, MI (US)

(72) Inventors: Frank Joseph Eigler, Windsor (CA); Richard Charles Cronin, Grand Rapids, MI (US)

(73) Assignee: DME COMPANY LLC, Madison Heights, MI (US)

( * ) Notice: Subject to any disclaimer, the term of this patent is extended or adjusted under 35 U.S.C. 154(b) by 507 days.

(21) Appl. No.: 15/774,338

(22) PCT Filed: Nov. 10, 2016

(86) PCT No.: PCT/US2016/061356
§ 371 (c)(1),
(2) Date: May 8, 2018

(87) PCT Pub. No.: WO2017/083536
PCT Pub. Date: May 18, 2017

(65) Prior Publication Data
US 2020/0247023 A1    Aug. 6, 2020

(51) Int. Cl.
*B29C 45/13* (2006.01)
*B29C 45/27* (2006.01)

(52) U.S. Cl.
CPC .......... *B29C 45/2727* (2013.01); *B29C 45/13* (2013.01); *B29C 2045/2733* (2013.01)

(58) Field of Classification Search
CPC ................ B29C 45/2727; B29C 45/13; B29C 2045/273
See application file for complete search history.

(56) References Cited

U.S. PATENT DOCUMENTS 3,985,486 A    10/1976  Hendry
5,540,580 A    7/1996   Takada
(Continued)

FOREIGN PATENT DOCUMENTS

CN    202985969 U      6/2013
JP    H07-112709 B2   12/1995
(Continued)

OTHER PUBLICATIONS

Extended European Search Report issued in European Application No. 16865014.1, dated Apr. 8, 2019.
(Continued)

*Primary Examiner* — Jacob T Minskey
*Assistant Examiner* — Adrien J Bernard
(74) *Attorney, Agent, or Firm* — Medler Ferro Woodhouse & Mills PLLC

(57) ABSTRACT

A reconfigurable melt delivery system is disclosed for use with a first injection unit and a second injection unit. The reconfigurable melt delivery system may include a first arm manifold configured to receive a moldable material from a second injection unit, an exchangeable second arm manifold in fluid communication with the first arm manifold that is configured to receive the moldable material from the first arm manifold and to transfer the moldable material to an outlet nozzle, and a repositionable and replaceable insert plate configured to be repositioned or replaced relative to remaining plates of the melt delivery system, wherein the outlet nozzle is secured within a mold facing surface of the insert plate and is radially offset from a central machine nozzle opening of the melt delivery system for delivering the moldable material to a corresponding offset mold gate of a two-material mold.

20 Claims, 9 Drawing Sheets

(56) References Cited

U.S. PATENT DOCUMENTS

| | | | |
|---|---|---|---|
| 5,700,500 | A | 12/1997 | Wilhelm |
| 7,172,411 | B2 | 2/2007 | Fairy |
| 7,500,843 | B2 | 3/2009 | Crain et al. |
| 7,708,551 | B2 | 5/2010 | Jenko et al. |
| 8,273,284 | B2 | 9/2012 | Lau et al. |
| 8,940,202 | B2 | 1/2015 | Catoen et al. |
| 9,174,373 | B2 | 11/2015 | Eimeke et al. |
| 2003/0209832 | A1* | 11/2003 | Steil .................. B29C 45/17 264/328.7 |
| 2006/0001195 | A1 | 1/2006 | Sicilia |
| 2006/0204611 | A1* | 9/2006 | Serniuk ............. B29C 45/2806 425/573 |
| 2007/0237853 | A1 | 10/2007 | Hsu |
| 2007/0292558 | A1 | 12/2007 | Irwin et al. |
| 2008/0279973 | A1 | 11/2008 | Susumu et al. |
| 2009/0047373 | A1 | 2/2009 | Galt et al. |
| 2009/0324767 | A1 | 12/2009 | Kloeppel et al. |
| 2014/0079840 | A1 | 3/2014 | Eigler et al. |
| 2015/0283736 | A1 | 10/2015 | Mai et al. |
| 2015/0375436 | A1* | 12/2015 | Spuller .................. B29C 45/74 425/549 |

FOREIGN PATENT DOCUMENTS

| | | |
|---|---|---|
| JP | 2006-007658 A | 1/2006 |
| WO | 2011/004418 A1 | 1/2011 |
| WO | 2014/001127 A1 | 1/2014 |
| WO | 2017/147714 A1 | 9/2017 |

OTHER PUBLICATIONS

Notification of the First Office Action issued in Chinese Application No. 2016800651048, dated Aug. 22, 2019.

International Search Report dated Dec. 29, 2016 in corresponding International Patent Application No. PCT/US2016/061356.

Written Opinion dated Dec. 29, 2016 in corresponding International Patent Application No. PCT/US2016/061356.

\* cited by examiner

RECONFIGURABLE MELT DELIVERY SYSTEM

CROSS-REFERENCE TO RELATED APPLICATION

The present application claims the benefit of U.S. Appl. No. 62/253,592, filed Nov. 10, 2015, which is hereby incorporated by reference in its entirety.

FIELD OF THE INVENTION

The present invention relates to injection molding, and more specifically to a melt delivery system between an outlet of a secondary injection unit and an inlet of a two-material mold.

BACKGROUND

Some injection molding machines are configured to have two barrels, i.e., a main injection unit and a secondary injection unit, in order to transfer two materials into a mold or molds, wherein the barrels may be parallel or perpendicular to each other. In another injection molding system, a main injection unit of an injection molding machine may be supplemented with an auxiliary injection unit that is operably attached thereto. The respective barrels of the main and auxiliary injection units, which may be parallel or perpendicular or of another orientation to each other, have a certain distance between them due to the size and complexity of the units. The secondary or offset barrel of the auxiliary injection unit is often situated outside of a stationary platen of the injection molding machine or press at a distance that in many instances is greater or larger than a distance between inlet or entry points (mold gates) of a two-material mold. Similarly, when a two-material mold is used in a two-material injection molding machine (molding press), barrels of the main and secondary injection units may be spaced apart in such a manner that outlets thereof do no align with the inlet or entry points of the mold. In either of the aforementioned dual injection unit set-ups, if the barrels' locations and configurations, as well as the locations of the inlet or entry points to the mold or molds, are fixed, a single stationary manifold can be used in a melt delivery system to transfer the melt from the offset secondary or auxiliary barrel to the offset inlet or entry point of the mold. If, however, an entry point on a mold for receiving a second material is not determined or a different mold or molds are to be used in the injection molding machine (molding press), which have different relatively positioned entry points than can be accommodated by a certain melt delivery system, it would be necessary to have a different, complete melt delivery system to transfer the melt from an offset secondary or auxiliary barrel to an offset entry point of the mold.

As should be evident from the preceding discussion, in two shot injection molding applications, the injection molding machine (molding press), either with two injection units or with main and auxiliary injection units, transfers two materials (a first material and a second material) to a mold via two inlet or entry points of the mold. One of the entry points of the mold usually aligns with a center of a platen (typically the stationary platen) of the injection molding machine, where a center locating ring mates with a bore in the stationary platen, and a main or center barrel of the main injection unit transfers a first material of the two materials to the mold. A second material is then transferred via the second inlet or entry point of the mold through a secondary or auxiliary barrel of a secondary or auxiliary injection unit. The secondary or auxiliary barrel is often located outside or away from the stationary platen. In many applications the secondary or auxiliary barrel may be parallel, perpendicular or at another orientation relative to the main or center barrel.

In many applications, the exit points (outlets) of the two barrels do not line up with the entry points (inlets) on the two-material mold for receiving the two materials and issues of leakage may arise during transfer of the first and/or second materials to the mold. Since one of the barrels of the injection units is often at the center of a platen (such as the main or center barrel of the injection molding machine), and generally one of the entry points (inlets) on the mold aligns with the center barrel, the main problem is to transfer a melt of a second material from the offset secondary or auxiliary barrel of the secondary or auxiliary injection unit to the offset entry point (inlet) on the mold for transferring the second material.

To make sure that a second material is transferred from the offset secondary or auxiliary barrel of the secondary or auxiliary injection unit to the offset entry point (inlet) of a two-material mold, a known melt delivery system (MDS) may be mounted on the stationary platen. A plate of the known MDS facing a two-material mold has mounting holes so the mold may be mounted on the MDS as if it was the stationary platen. An entry point (inlet) of the MDS aligns with an exit point (outlet) of the offset barrel, and an exit point (outlet) of the MDS aligns with an offset entry point (inlet) of the two-material mold. The known MDS has one customized manifold enclosed within plates that is suitable for only a single arrangement (relative positioning) of entry points (inlets) on a certain two-material mold.

A problem arises with the known MDS in that two-material molds are designed and built by different companies who use different standards or configurations in which a second, offset entry point (inlet) of various two-material molds for receiving a second material from the offset barrel of a secondary or auxiliary injection unit are typically different from mold to mold. To be able to run two-material molds having different inlet configurations in a given dual injection unit set-up, a particular or unique MDS would be needed with a manifold and associated plates to connect an exit point of the offset barrel with an offset entry point on the particular two-material mold. This means that each two-material mold with a differently located second material entry point needs to have a mating, custom or unique MDS.

Since a known MDS is similar in size to a platen of the injection molding machine or molding press, each MDS is expensive to build and, in reality, it is not practical to have a different MDS fabricated for each two-material mold configuration. Stated another way, often if there is a new two-material mold configuration, a new MDS that can mate therewith may be needed because an offset entry point of the mold for receiving the second material can be different for the new mold configuration. Unfortunately, to make a new, complete MDS for every change in mold configuration is expensive and time consuming, and thus not desirable.

SUMMARY

Embodiment hereof are directed to a reconfigurable melt delivery system for use with a first injection unit and a second injection unit. The reconfigurable melt delivery system may include a first arm manifold, an exchangeable second arm manifold in fluid communication with the first arm manifold, and an outlet nozzle radially offset from a central machine nozzle opening of the melt delivery system, wherein the first arm manifold is configured to receive a moldable material from a second injection unit, and the second arm manifold is configured to receive the moldable material from the first arm manifold and to transfer the moldable material to the outlet nozzle for delivering the moldable material to a corresponding offset mold gate of a two-material mold.

In embodiments, the reconfigurable melt delivery system may further include one or more plates such as a mounting plate, a frame plate having a central opening that is closed on a first side by the mounting plate to form an enclosure, and a retainer plate having an insert plate releasably attached within a central opening thereof. In an embodiment, the reconfigurable melt delivery system may include the first arm manifold coupled with mounting and frame plates. In an embodiment, the second arm manifold may be coupled with retainer and insert plates to be disposed within an enclosure of the melt delivery system when the retainer and insert plates are attached to remaining plates of the system. In an embodiment, a platen side of a mounting plate (or another plate) may be configured to be secured against a platen of an injection molding machine. In an embodiment, mold facing surfaces of retainer and insert plates (or another outer plate) may include mounting holes therein for securing a two-material mold to the melt delivery system. In an embodiment, an outlet nozzle may be secured within a mold facing surface of an insert plate, or other replaceable plate.

In embodiments hereof, a reconfigurable melt delivery system may further include an inlet component for interfacing with an outlet of a second injection unit and for receiving a moldable material therefrom, wherein the inlet component may be secured to the melt delivery system to be in fluid communication with a first arm manifold for transferring the moldable material thereto.

In embodiments hereof, a reconfigurable melt delivery system may further include an enclosure defined within plates of the melt delivery system that may be at least partially covered on a mold side of the melt delivery system by a repositionable insert plate, wherein a second arm manifold may be coupled with the insert plate to be disposed within the enclosure when the insert plate is attached to the remaining plates.

In an embodiment, an outlet nozzle may be secured within a mold facing surface of an insert plate. In an embodiment, an insert plate may be configured to be repositioned relative to the remaining plates such that an outlet nozzle may be radially offset in different directions from a central machine nozzle opening depending on an orientation of the insert plate relative to the remaining plates.

In an embodiment, a second arm manifold of a reconfigurable melt delivery system may extend within an enclosure thereof from a first arm manifold to an outlet nozzle, wherein the second arm manifold may be repositioned within the enclosure relative to an insert plate to accommodate a change of a radial offset position of the outlet nozzle.

In an embodiment of a reconfigurable melt delivery system, a second arm manifold may be exchanged for another second arm manifold of a different length to accommodate a change of a radial offset position of an outlet nozzle.

Embodiments hereof are directed to a reconfigurable melt delivery system for use with a first injection unit and a second injection unit. The reconfigurable melt delivery system may include a first arm manifold configured to receive a moldable material from a second injection unit, an exchangeable second arm manifold in fluid communication with the first arm manifold that is configured to receive the moldable material from the first arm manifold and to transfer the moldable material to an outlet nozzle, and a repositionable and replaceable insert plate configured to be repositioned or replaced relative to remaining plates of the melt delivery system, wherein the outlet nozzle is secured within a mold facing surface of the insert plate and is radially offset from a central machine nozzle opening of the melt delivery system for delivering the moldable material to a corresponding offset mold gate of a two-material mold.

In embodiments, an exchangeable second arm manifold of a reconfigurable melt delivery system in accordance herewith may be exchanged for another second arm manifold of a different length.

In embodiments, a repositionable and replaceable insert plate a reconfigurable melt delivery system in accordance herewith may be repositioned relative to remaining plates such that an outlet nozzle is radially offset in different directions from a central machine nozzle opening depending on an orientation of the insert plate relative to the remaining plates. In an embodiment, a repositionable and replaceable insert plate may be configured to be replaced relative to remaining plates by another insert plate that is configured to position an outlet nozzle in a radially offset direction that corresponds with an offset mold gate of another two-material mold. In an embodiment, an insert plate may be configured to fit within a central opening of a retainer plate of remaining plates of the melt delivery system and may be configured to be repositioned within the central opening. In an embodiment, an enclosure may be defined within remaining plates of the melt delivery system that may be at least partially covered on a mold side of the melt delivery system by retaining and insert plates, wherein a second arm manifold may be coupled with the insert plate to be disposed within the enclosure when the retaining and insert plates are attached to the remaining plates. In an embodiment, a second arm manifold of a reconfigurable melt delivery system in accordance herewith may be repositioned within an enclosure of the system relative to an insert plate to accommodate a change of a radial offset position of an outlet nozzle.

DESCRIPTION OF THE FIGURES

The foregoing and other features and aspects of the present technology can be better understood from the following description of embodiments and as illustrated in the accompanying drawings. The accompanying drawings, which are incorporated herein and form a part of the specification, further serve to illustrate the principles of the present technology. The components in the drawings are not necessarily to scale.

DETAILED DESCRIPTION

Figure 1:
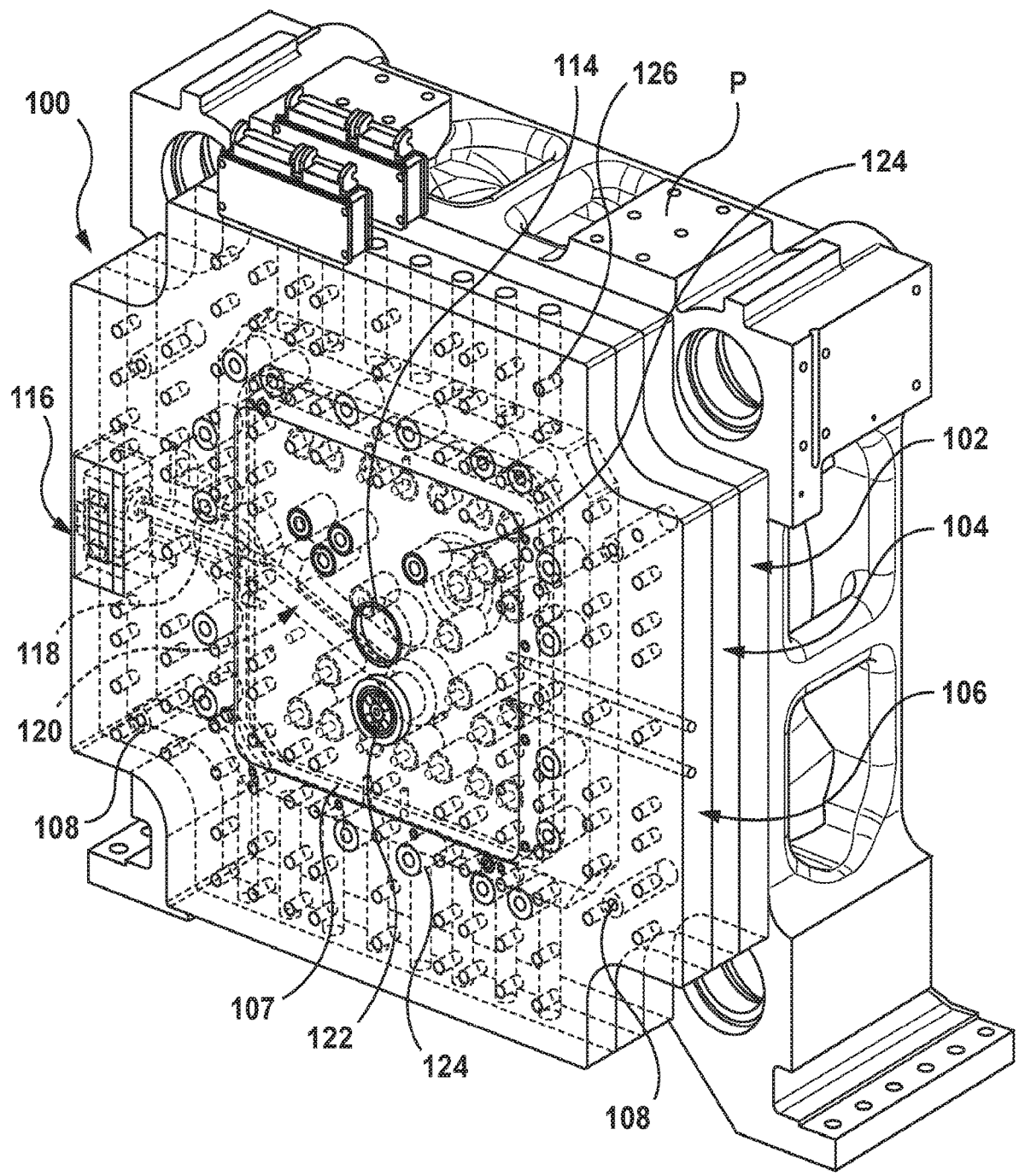
FIG. 1 is a perspective view of a flexible or reconfigurable melt delivery system in accordance with an embodiment hereof that is shown mounted to a platen of an injection molding machine, wherein the platen is shown removed from the injection molding machine for illustrative purposes.

Embodiments hereof are directed to a flexible or reconfigurable melt delivery system that solves the problems noted above. In accordance with an embodiment hereof, and as shown in FIGS. 1-8, a reconfigurable melt delivery system 100 includes a mounting plate 102, a frame plate 104 and a retainer plate 106, which are attached/secured to each other by various means as would be understood by one of ordinary skill in the art. Within the retainer plate 106 is an exchangeable insert plate 107 that is attachable within a central opening or cut-out 105 of the retainer plate at various selectable orientations, as should be readily apparent from a comparison of FIGS. 2 and 7 and as described in more detail below.

The reconfigurable melt delivery system 100 includes a primary or central machine nozzle opening 114 for receiving an outlet or machine nozzle of a main or central barrel of a main injection unit (not shown) there through. The machine nozzle of the main or central barrel of a main injection unit is used with the reconfigurable melt delivery system 100 for delivering a first moldable material to a first entry or inlet point of a two-material mold, such as a first mold gate M1 of a two-material mold M of FIG. 5A. The central machine nozzle opening 114 is partially defined by aligned bores 114A, 114B that are formed through the mounting plate 102 and the insert plate 107, respectively. The central machine nozzle opening 114 is configured to align with a central opening CO (FIG. 5) in the platen P and is disposed on a common centerline CL of the platen P and the melt delivery system 100.

Figure 5:
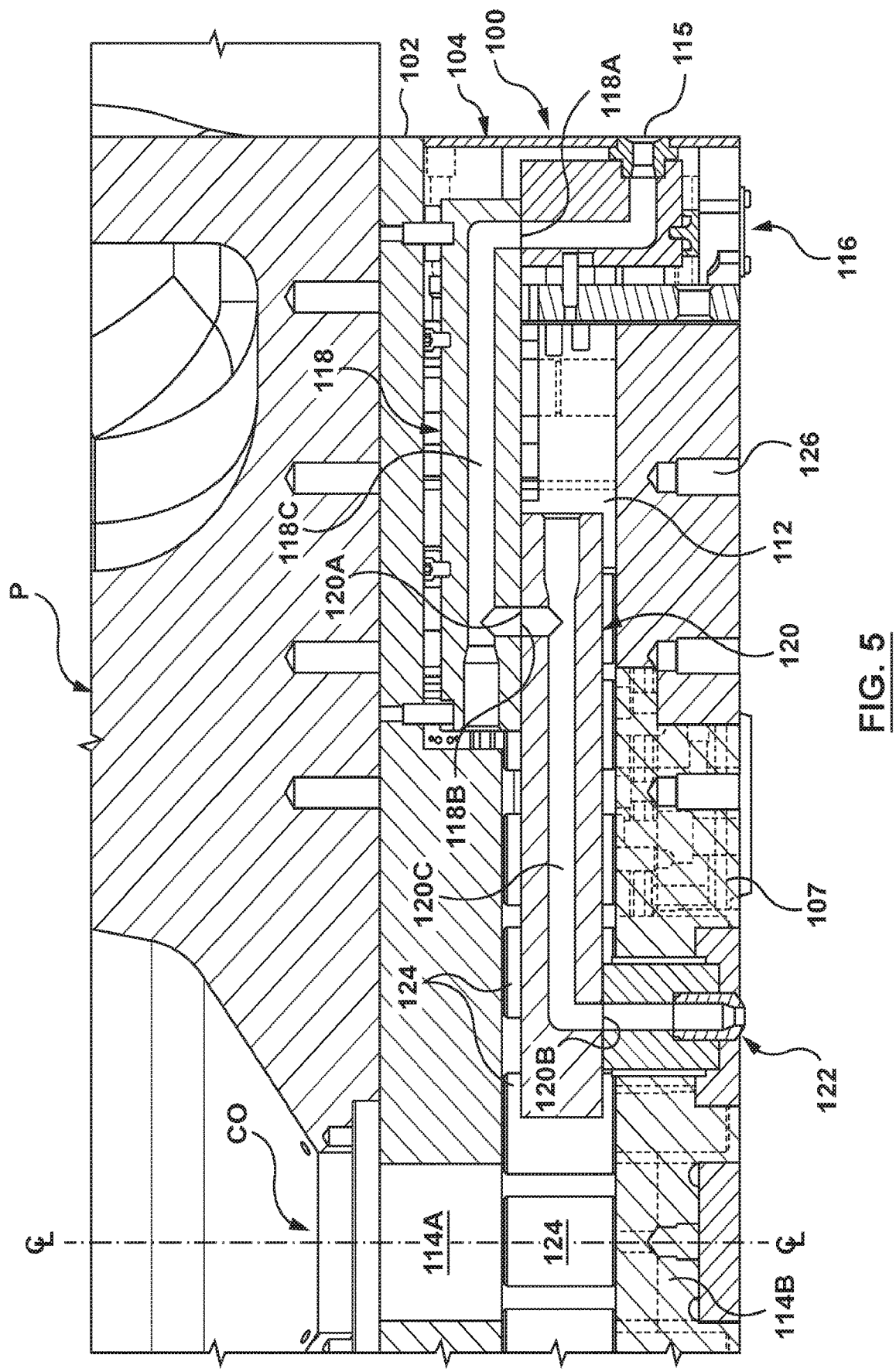
FIG. 5 is a sectional view the melt delivery system of FIG. 1 taken through its first and second arm manifolds.
Figure 5A:
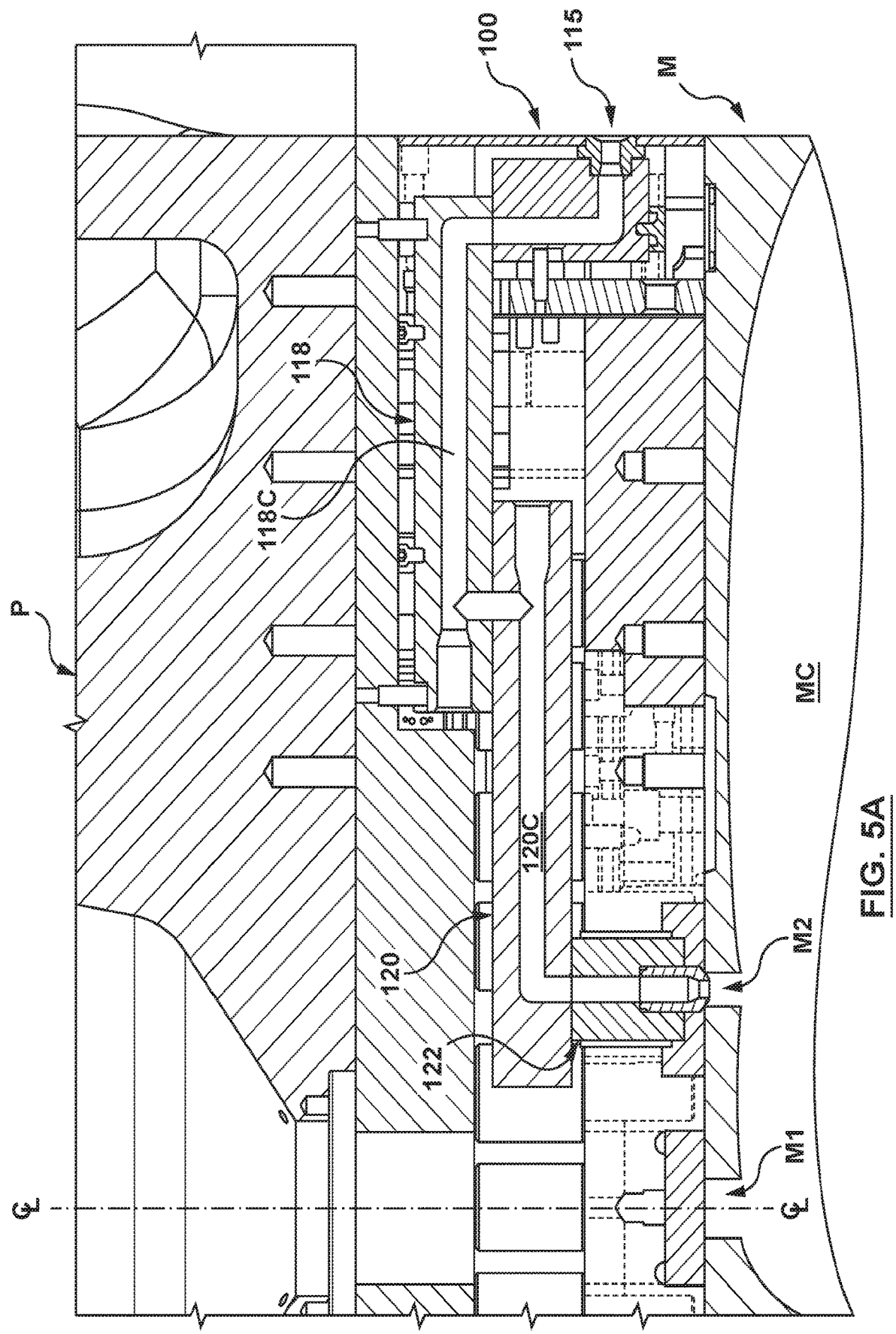
FIG. 5A is the sectional view of FIG. 5 showing a two-material mold coupled to the melt delivery system.
Figure 6:
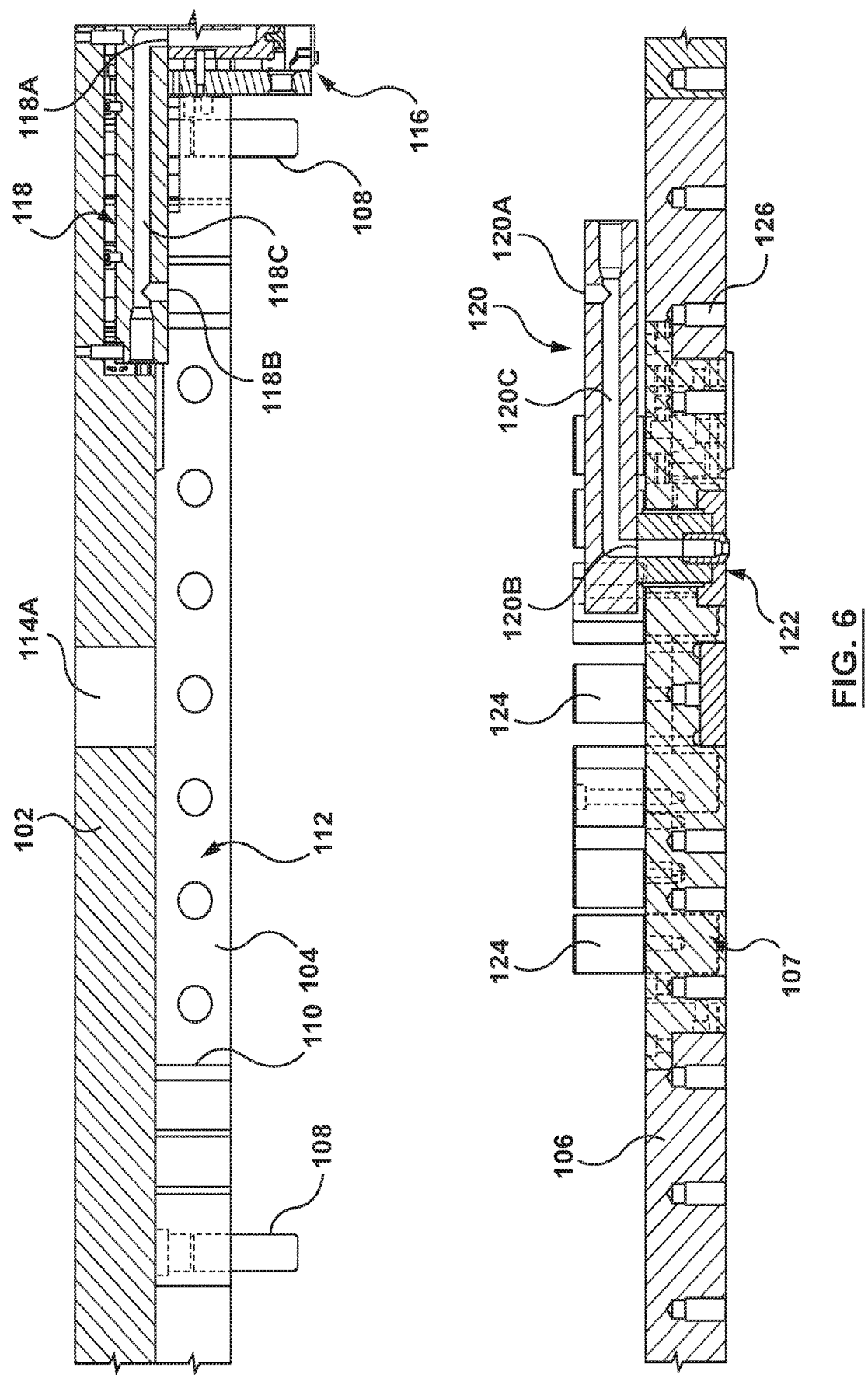
FIG. 6 is a partially disassembled, sectional bottom view of the melt delivery system of FIG. 1.

The reconfigurable melt delivery system 100 also includes a melt inlet component 116 for receiving and/or mating with an outlet of a secondary or auxiliary barrel of a secondary or auxiliary injection unit (not shown). In an embodiment, the melt inlet component 116 may alternatively be referred to as a second injection unit interface or a secondary nozzle interface. More particularly, the melt inlet component 116 includes an inlet 115 for receiving a second moldable material from a secondary or auxiliary barrel of a secondary or auxiliary injection unit (not shown) and for transferring the second moldable material to an offset (second) entry or inlet point of a two-material mold, such as a second mold gate M2 of the two-material mold M of FIG. 5A. The first and second mold gates M1, M2 direct first and second moldable materials, respectively, into a mold cavity MC of the two-material mold M, as schematically represented in FIG. 5A. As also schematically represented in FIG. 5, the offset entry (inlet) point (offset second mold gate M2) of a two-material mold is radially offset from a centerline CL of the two-material mold M, which is the same centerline CL of the platen P and the melt delivery system 100.

Figure 7:
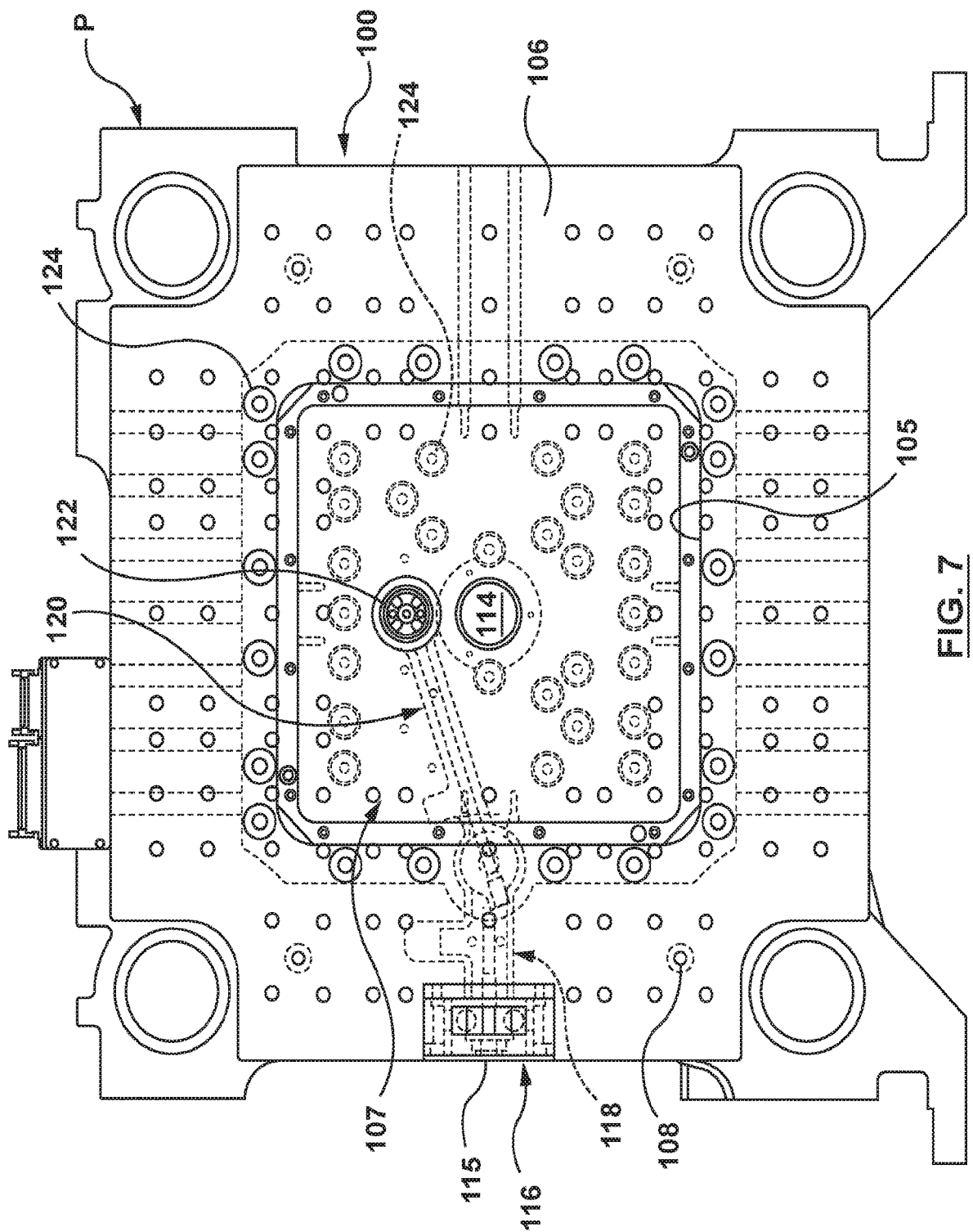
FIG. 7 is a front view of the flexible or reconfigurable melt delivery system of FIG. 1 in which an insert plate has been rotated 180° such that an outlet of a second arm manifold is positioned at 12 o'clock relative to a machine nozzle opening at a center thereof.
Figure 8:
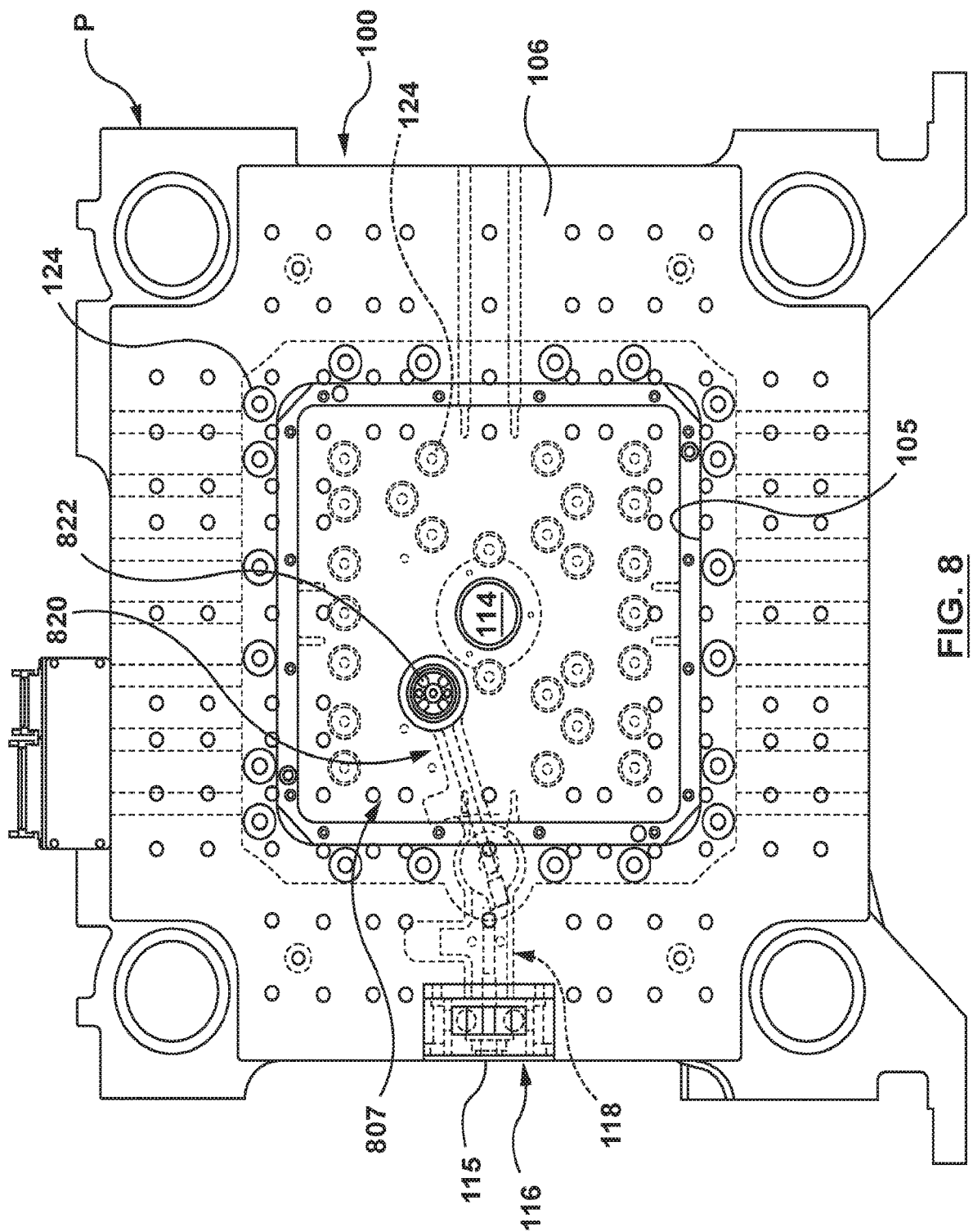
FIG. 8 is a front view of the flexible or reconfigurable melt delivery system of FIG. 1 in accordance with an embodiment hereof in which a second set of an insert plate and a second arm manifold have been substituted for the set shown in FIG. 1, and wherein an outlet of the second arm manifold is positioned at 10 o'clock relative to a machine nozzle opening at a center thereof.

In accordance with embodiments hereof, the inlet 115 is in fluid communication with an offset second entry or inlet point of a two-material mold (such as a second mold gate M2 of the two-material mold M of FIG. 5A) via a fixed first arm manifold 118 and a second arm manifold 120, which may be rearranged relative to the insert plate 107 and/or exchangeable with another length second arm manifold as described below. In embodiments hereof, the first and second arm manifolds 118, 120 include first and second melt channels 118C, 120C, respectively, that extend there through (see FIGS. 5 and 6). In embodiments hereof, the first and second arm manifolds 118, 120 may be referred to as single drop manifolds. The first arm manifold 118 is fixed within the frame plate 104 and the second arm manifold 120 is removably coupled to the insert plate 107 to be repositioned or rearranged thereon when the insert plate 107 is re-oriented relative to the frame plate 104 (FIG. 7), or exchangeable therewith (FIG. 8). An inlet 118A of the first arm manifold 118 is in fluid communication with the inlet 115 for receiving a second moldable material therefrom and an outlet 118B of the first arm manifold 118 is in fluid communication with an inlet 120A of the second arm manifold 120 for transferring the second moldable material thereto. In turn, the second arm manifold 120 has an outlet 120B in fluid communication with an outlet nozzle 122 for delivering the second moldable material to an offset second entry or inlet point of a two-material mold (such as a second mold gate M2 of the two-material mold M of FIG. 5A).

The mounting plate 102 is a planar piece that is configured to be positioned against a platen P, such as a stationary platen, of an injection molding machine (not shown). In an embodiment, each of the mounting plate 102, the frame plate 104 and the retainer plate 106 may include aligned bore holes that receive alignment pins 108 for aligning the joined plates on the platen P so that the melt delivery system 100 is properly position on the platen P, as would be understood by one of ordinary skill in the art.

The frame plate 104 includes a central opening or cut-out 110 there through that is closed on one side, the platen side, by the mounting plate 102 to form a pocket (enclosure) 112. The pocket (enclosure) 112 is sized to receive therein the second arm manifold 120 that is attached to a platen side of the insert plate 107, when the retainer and insert plates 106, 107 are attached to the mounting and frame plates 102, 104. As well various spacers 124 are disposed and arranged within the pocket 112 to support the retainer and insert plates 106, 107 when they are attached to a remainder of the reconfigurable melt delivery system 100, i.e., to mounting and frame plates 102, 104. Mold facing surfaces 106A, 107A of the retainer and insert plates 106, 107 include mounting holes 126 therein for securing a two-material mold (such the two-material mold M of FIG. 5A) to the melt delivery system 100, in a manner similar to when such a mold is attached to a stationary platen of an injection molding machine.

As discussed above, embodiments of reconfigurable melt delivery systems in accordance herewith may have two manifolds (arm manifolds) with a first, fixed length/size arm manifold, such as first arm manifold 118, fixedly attached to the system, and an exchangeable second arm manifold, such as second arm manifold 120, that may be selected to be any suitable length for extending between an outlet of the first arm manifold and an outlet nozzle (such as outlet nozzle 122) that is aligned with an offset (second) entry point of a respective two-material mold. In addition to the two arm manifolds, a smaller insert plate 107 may be provided that fits into the cut-out 105 in a large retainer plate (such as retainer plate 106) facing the mold. The smaller insert plate 107 with the corresponding second arm manifold 120 comprise a set of exchangeable components that can be designed, and fabricated within a short time, and may be much more cost effective to replace than making a completely new melt delivery system to bridge a distance between a second or auxiliary barrel outlet and an offset (second) entry point (offset mold gate) for each two-material mold configuration. Stated another way, in embodiments hereof, a second arm manifold and a corresponding insert plate may form a replaceable set of components of a reconfigurable melt delivery system in accordance herewith.

Figure 2:
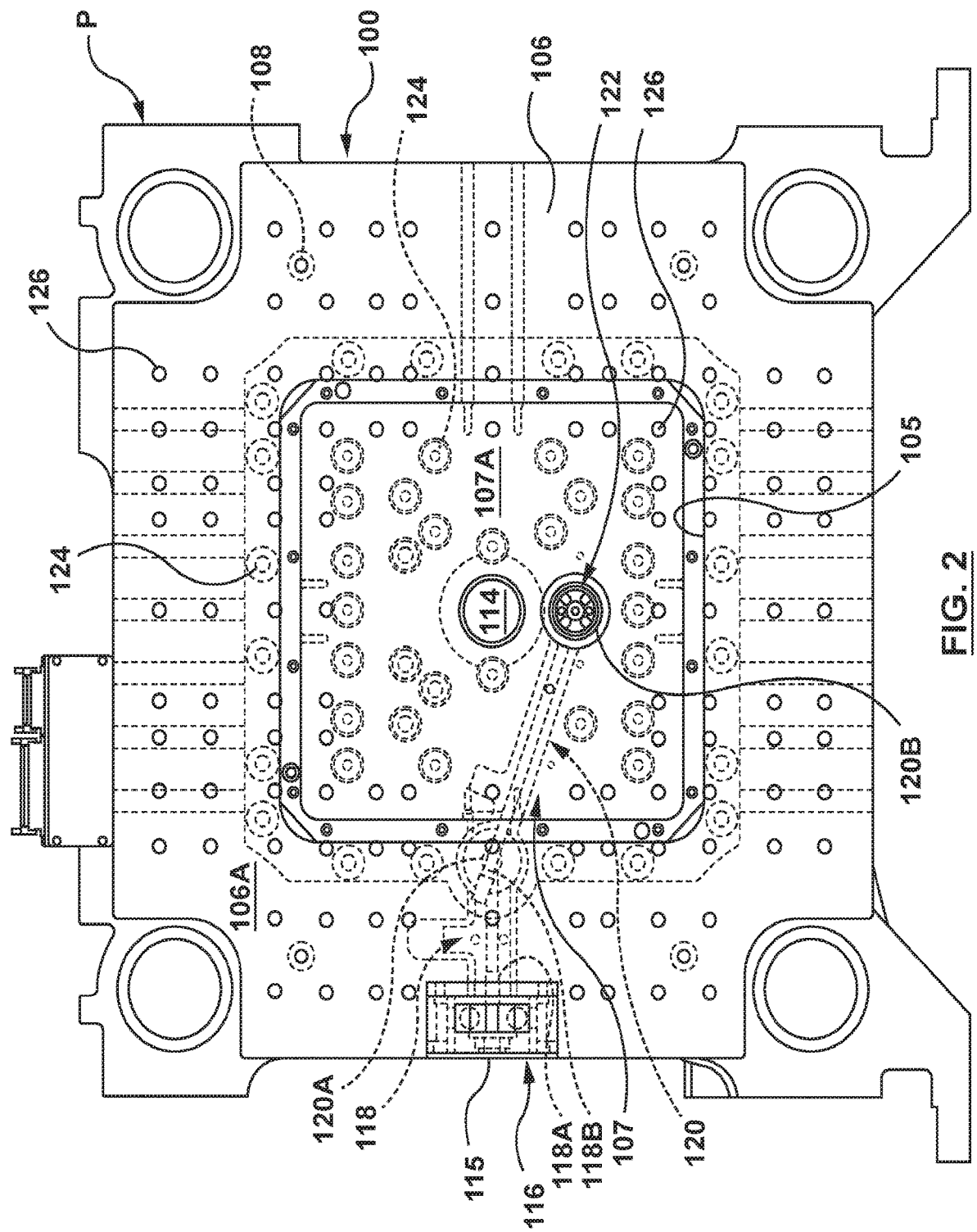
FIG. 2 is a front view of the melt delivery system shown in FIG. 1.
Figure 3:
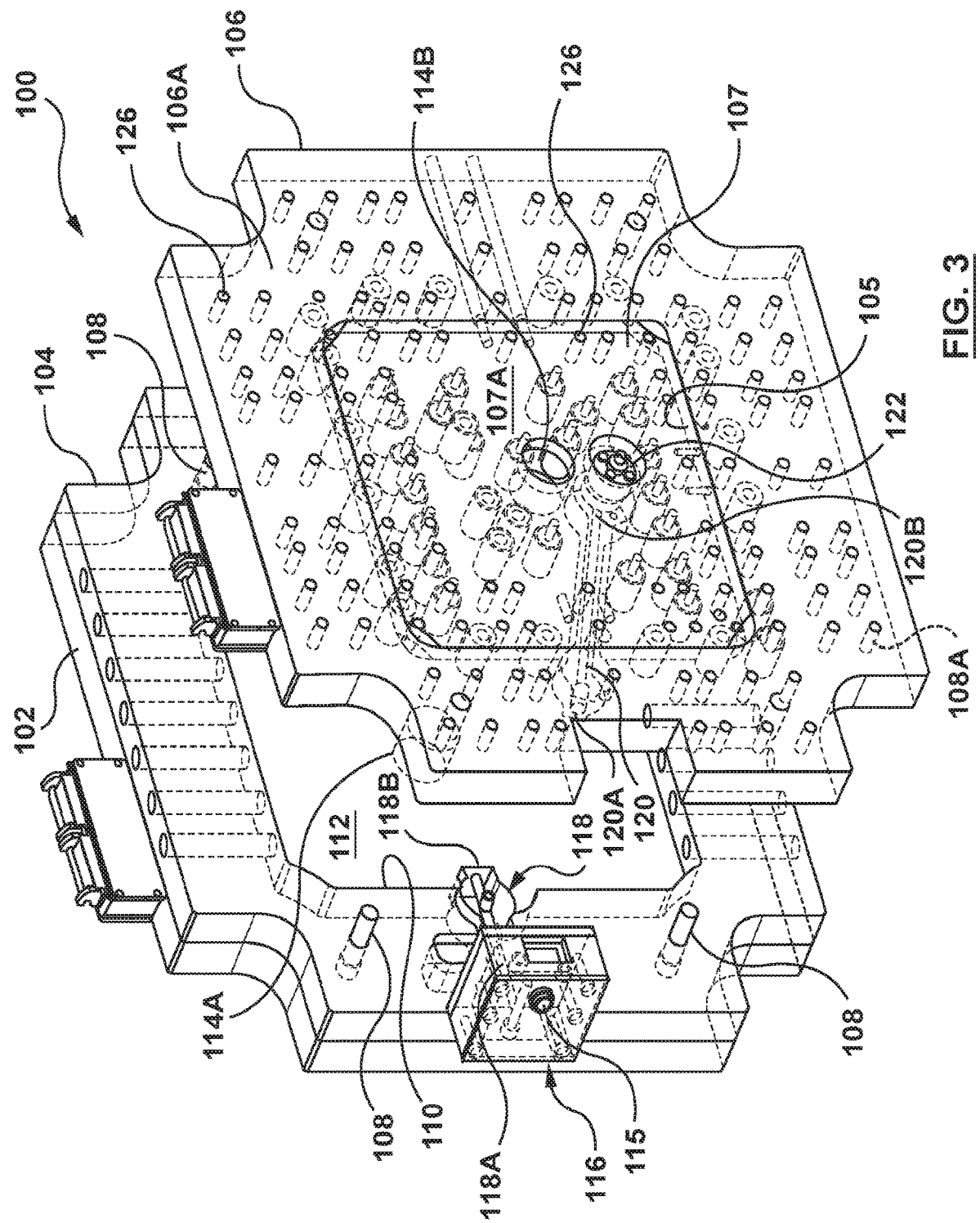
FIG. 3 is a perspective, partially disassembled front view of the melt delivery system of FIG. 1.
Figure 4:
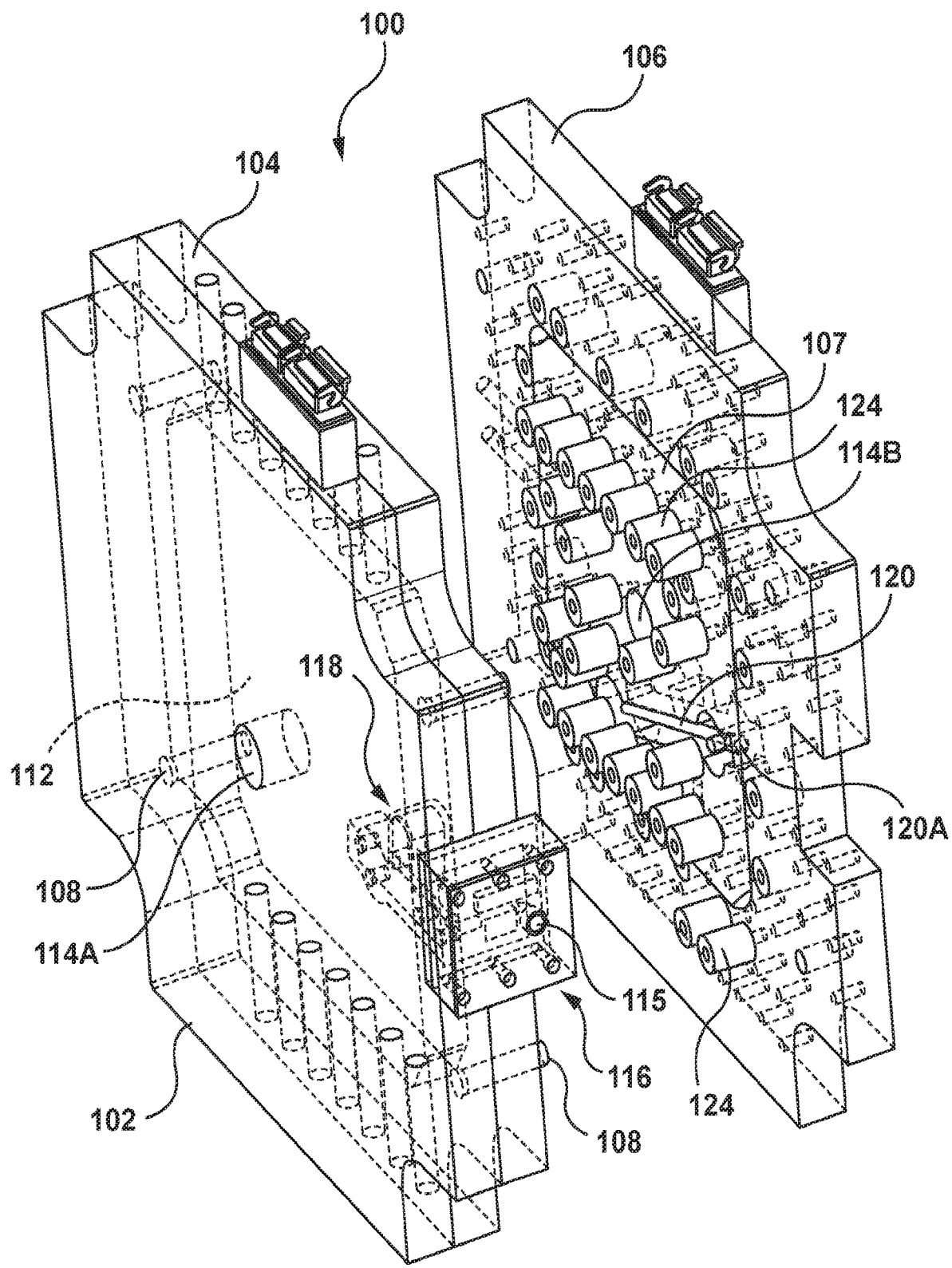
FIG. 4 is a perspective, partially disassembled rear view of the melt delivery system of FIG. 1.

In addition to the features noted above, a respective insert plate 107 may be placed in a cut-out 105 of a retainer plate 106 in different orientations, such as rotated by 90, 180 and 270 degrees from an original orientation, so one insert plate 107 may accommodate four different offset (second) mold entry points when used with a second arm manifold of a suitable length to extend between an outlet of a first arm manifold and an outlet nozzle disposed on the insert plate. For instance in FIG. 2, the outlet nozzle 122 at an outlet end of the second arm manifold 120 (both of which are attached to insert plate 107) is disposed at a 6 o'clock position relative to central machine nozzle opening 114. With reference to FIG. 7, the same insert plate 107 is shown repositioned 180 degrees relative to a remainder of the melt delivery system 100 (from as shown in FIG. 2) and thereby has the outlet nozzle 122 disposed at 12 o'clock position relative to the central machine nozzle opening 114, with the second arm manifold 120 having been repositioned on the insert plate 107 to extend (bridge the distance) between the first arm manifold 118 and the outlet nozzle 122.

With reference to FIG. 8, another or second set of an insert plate 807 and a second arm manifold 820 in accordance with an embodiment hereof is shown attached to the retainer plate 106 of the melt delivery system 100. The second arm manifold 820 is shorter than the second arm manifold 120 of the prior embodiment as it only need to extend from the first arm manifold 118 to an outlet nozzle 822 that is disposed at a 10 o'clock position relative to the central machine nozzle opening 114, and which is aligned with an offset secondary entry point of a mold thereunder (such as a second mold gate M2 of the two-material mold M of FIG. 5A).

According to embodiments hereof, instead of constructing individual, complete melt delivery systems for each mold configuration, a reconfigurable or flexible melt delivery system having a mounting plate with retainer and frame plates and housing a fixed first arm manifold can be used in conjunction with a different second arm manifold, such as a longer or short second arm manifold, and an associated insert plate, which may form an exchangeable set of components, to accommodate two-material molds having different configurations or positioning of offset (second) entry/inlet points relative to main (first, central) entry/inlet points. Changing out only a portion (a set of a second arm manifold and associated insert plate) of a reconfigurable melt delivery system in accordance herewith offers a more cost effective and less time consuming solution to the problems noted above in the Background.

As well reconfigurable melt delivery systems in accordance herewith may reduce the number of components that are different or unique to each mold, and thus may reduce the number of components that need to be changed for a different exit point (outlet nozzle) of the system to match different entry points (inlets) of different two-material molds. As well in accordance with embodiments hereof, the number of components may be reduced due to reuse of many of the same components, e.g., the mounting, frame and retainer plates, and the first arm manifold, as well as the repositionable insert plate, for different mold configurations, such that any given component may be used again regardless of the location of a two-material mold's offset (second) entry/inlet point.

While various embodiments have been described above, it should be understood that they have been presented only as illustrations and examples of the present technology, and not by way of limitation. It will be apparent to persons skilled in the relevant art that various changes in form and detail can be made therein without departing from the spirit and scope of the present technology. Thus, the breadth and scope of the present technology should not be limited by any of the above-described embodiments, but should be defined only in accordance with the appended claims and their equivalents. It will also be understood that each feature of each embodiment discussed herein, and of each reference cited herein, can be used in combination with the features of any other embodiment.

What is claimed is:

1. A reconfigurable melt delivery system suitable for use with an injection molding machine, a second injection unit, and a two-material mold, the reconfigurable melt delivery system comprising:
    a mounting plate;
    a frame plate attached to the mounting plate and having a frame plate central opening extending therethrough, the frame plate central opening being closed on a first side by the mounting plate to form an enclosure;
    a retainer plate attached to the frame plate, the retainer plate having a retainer plate central opening extending therethrough;
    an insert plate releasably attached within the retainer plate central opening;
    a central opening sized to receive a molding machine nozzle, the central opening extending through the mounting plate and the insert plate, wherein in operation, the molding machine nozzle of the injection molding machine extends through the central opening and the frame plate central opening to deliver a first moldable material to a first moldable material inlet of the two-material mold;
    a first arm manifold fixedly attached to the reconfigurable melt delivery system, the first arm manifold configured to receive a second moldable material from the second injection unit;
    an exchangeable second arm manifold received in the enclosure, the exchangeable second arm manifold configured to receive the second moldable material from the first arm manifold; and
    an outlet nozzle in fluid communication with the exchangeable second arm manifold to deliver the second moldable material to a second moldable material inlet of the two-material mold, the outlet nozzle and the second moldable material inlet being radially offset from the central opening.

2. The reconfigurable melt delivery system of claim 1, wherein the first arm manifold is coupled with the mounting and frame plates.

3. The reconfigurable melt delivery system of claim 1, wherein the second arm manifold is coupled with the retainer and insert plates to be disposed within the enclosure when the retainer and insert plates are attached to the mounting and frame plates.

4. The reconfigurable melt delivery system of claim 1, wherein a platen side of the mounting plate is configured to be secured against a platen of the injection molding machine.

5. The reconfigurable melt delivery system of claim 1, wherein mold facing surfaces of the retainer and insert plates include mounting holes therein for securing the two-material mold to the melt delivery system.

6. The reconfigurable melt delivery system of claim 5, wherein the outlet nozzle is secured within the mold facing surface of the insert plate.

7. The reconfigurable melt delivery system of claim 1, further comprising:
an inlet component for interfacing with an outlet of the second injection unit and for receiving the second moldable material therefrom, wherein the inlet component is secured to the melt delivery system and is in fluid communication with the first arm manifold for transferring the second moldable material thereto.

8. The reconfigurable melt delivery system of claim 1, wherein the enclosure is at least partially covered on a mold side of the reconfigurable melt delivery system by the insert plate, wherein the second arm manifold is coupled with the insert plate to be disposed within the enclosure when the insert plate is attached to the remaining plates.

9. The reconfigurable melt delivery system of claim 8, wherein the insert plate is configured to be repositioned within the retainer plate central opening such that the outlet nozzle is radially offset in different directions from the central opening depending on an orientation of the insert plate relative to the remaining plates.

10. The reconfigurable melt delivery system of claim 9, wherein the second arm manifold extends within the enclosure from the first arm manifold to the outlet nozzle and wherein the second arm manifold may be repositioned within the enclosure relative to the insert plate to accommodate a change of a radial offset position of the outlet nozzle.

11. The reconfigurable melt delivery system of claim 10, wherein the second arm manifold may be exchanged for another second arm manifold of a different length to accommodate the change of a radial offset position of the outlet nozzle.

12. A reconfigurable melt delivery system suitable for use with an injection molding machine, a second injection unit, and a two-material mold, the reconfigurable melt delivery system comprising:
a first arm manifold configured to receive a moldable material from the second injection unit;
an exchangeable second arm manifold in fluid communication with the first arm manifold, the second arm manifold being configured to receive the moldable material from the first arm manifold;
an outlet nozzle at an outlet end of the second arm manifold for receiving the moldable material from the second arm manifold; and
a replaceable insert plate configured to be replaced relative to remaining plates of the melt delivery system, wherein the outlet nozzle is secured within a mold facing surface of the replaceable insert plate to deliver the moldable material to a moldable material inlet of the two-material mold and the outlet nozzle being radially offset from a central opening of the melt delivery system, the central opening extending through the replaceable insert plate and being sized to receive a molding machine nozzle therein, wherein in operation, the molding machine nozzle of the injection molding machine extends through the central opening to deliver another moldable material to another moldable material inlet of the two-material mold.

13. The reconfigurable melt delivery system of claim 12, wherein the exchangeable second arm manifold may be exchanged for another second arm manifold of a different length.

14. The reconfigurable melt delivery system of claim 12, wherein the replaceable insert plate is configured to be repositioned relative to the remaining plates such that the outlet nozzle is radially offset in different directions from the central opening depending on an orientation of the insert plate relative to the remaining plates.

15. The reconfigurable melt delivery system of claim 12, wherein the replaceable insert plate is configured to be replaced relative to the remaining plates by another insert plate that is configured to position the outlet nozzle in a radially offset direction that corresponds with an offset mold gate of another two-material mold.

16. The reconfigurable melt delivery system of claim 12, wherein the insert plate is configured to fit within a central opening of a retainer plate of the remaining plates and is configured to be repositioned within the central opening.

17. The reconfigurable melt delivery system of claim 16, further comprising:
an enclosure defined within the remaining plates of the melt delivery system that is at least partially covered on a mold side of the melt delivery system by the retainer and insert plates, wherein the second arm manifold is coupled with the insert plate to be disposed within the enclosure when the retainer and insert plates are attached to the remaining plates.

18. The reconfigurable melt delivery system of claim 17, wherein the second arm manifold may be repositioned within the enclosure relative to the insert plate to accommodate a change of a radial offset position of the outlet nozzle.

19. The reconfigurable melt delivery system of claim 1, further comprising:
a plurality of spacers arranged within the enclosure to support the retainer plate and the insert plate when the insert plate is within the retainer plate central opening and the retainer plate is attached to the frame plate.

20. The reconfigurable melt delivery system of claim 12, further comprising: a plurality of spacers disposed between the replaceable insert plate and a mounting plate of the melt delivery system.

* * * * *